US010380025B2

United States Patent
Goldsack et al.

(10) Patent No.: US 10,380,025 B2
(45) Date of Patent: Aug. 13, 2019

(54) ACCESSING OBJECTS VIA OBJECT REFERENCES

(71) Applicant: HEWLETT PACKARD ENTERPRISE DEVELOPMENT LP, Houston, TX (US)

(72) Inventors: Patrick Goldsack, Bristol (GB); James Salter, Bristol (GB); Adrian John Baldwin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/756,056

(22) PCT Filed: Jan. 19, 2016

(86) PCT No.: PCT/US2016/013910
§ 371 (c)(1),
(2) Date: Feb. 27, 2018

(87) PCT Pub. No.: WO2017/127054
PCT Pub. Date: Jul. 27, 2017

(65) Prior Publication Data
US 2018/0246813 A1 Aug. 30, 2018

(51) Int. Cl.
*G06F 12/0895* (2016.01)
*G06F 9/00* (2006.01)
(Continued)

(52) U.S. Cl.
CPC ............ *G06F 12/0895* (2013.01); *G06F 9/00* (2013.01); *G06F 12/0215* (2013.01);
(Continued)

(58) Field of Classification Search
None
See application file for complete search history.

(56) References Cited

U.S. PATENT DOCUMENTS

| 6,874,066 B2 | 3/2005 | Traversat et al. |
| 7,328,217 B2 * | 2/2008 | Borthakur ............... G06F 16/10 707/823 |

(Continued)

OTHER PUBLICATIONS

International Search Report and Written Opinion, International Application No. PCT/US2016/013910, dated Oct. 12, 2016, pp. 1-7, KIPO.

(Continued)

*Primary Examiner* — Michael Alsip
(74) *Attorney, Agent, or Firm* — Hewlett Packard Enterprise Patent Department (57) ABSTRACT

An example system in accordance with an aspect of the present disclosure includes a cache engine, a validate engine, and an access engine. The cache engine is to cache, into an address cache of an object reference, an object address corresponding to an object, in response to performing a lookup of the object via at least one indirection. The validate engine is to validate that an object ID of the object located at the cached object address corresponds to a reference object ID that is stored in the object reference and associated with the object. The access engine is to access the object via a lookup of the object address cached in the address cache of the object reference, in response to validating the reference object ID.

15 Claims, 7 Drawing Sheets

(51) Int. Cl.
  *G06F 12/14* (2006.01)
  *G06F 12/02* (2006.01)
  *G06F 12/0864* (2016.01)

(52) U.S. Cl.
  CPC ...... *G06F 12/0292* (2013.01); *G06F 12/0864* (2013.01); *G06F 12/145* (2013.01)

(56) References Cited

U.S. PATENT DOCUMENTS

| | | |
|---|---|---|
| 7,603,530 B1 | 10/2009 | Liikanen et al. |
| 7,895,405 B2 | 2/2011 | Ebara et al. |
| 8,478,799 B2 * | 7/2013 | Beaverson ............ G06F 16/137 |
| | | 707/823 |
| 8,667,248 B1 | 3/2014 | Neppaiii |
| 8,868,844 B2 | 10/2014 | Nutter et al. |
| 8,892,817 B2 | 11/2014 | Bandic et al. |
| 2003/0191846 A1 | 10/2003 | Hunnicutt et al. |
| 2010/0115203 A1 | 5/2010 | White |
| 2014/0173200 A1 | 6/2014 | Aue et al. |
| 2015/0309935 A1 | 10/2015 | Musumeci et al. |

OTHER PUBLICATIONS

"File System Fundamentals: Use, API, and Implementation," Oct. 29, 2014, pp. 1-68, CS439: Principles of Computer Systems, The University of Texas at Austin.

\* cited by examiner

ACCESSING OBJECTS VIA OBJECT REFERENCES

BACKGROUND

Computing systems can include very large memory pools, such as a non-volatile memory (NVM) space larger than a virtual memory address (VA) space that the computing system is capable of addressing. Thus, it may not be possible to map some regions of the NVM into the same VA space simultaneously, for the computing system to work on at the same time. Accordingly, data and its corresponding structures will appear to move around in memory over time. In some cases, different computing systems may simultaneously see a segment of NVM at different addresses. This raises the risk of programs inadvertently writing to an "old" address for a structure, instead of that structure's current address, thereby corrupting some other data located at the "old" address in a random manner.

DETAILED DESCRIPTION

Computing systems can include massive amounts of non-volatile memory (NVM), which can be used to store a number of heap structures (known as datasets, which can be implemented as heaps) that can hold within them data objects (a data object being identifiable by a unique object ID). Not all datasets will be simultaneously addressable, and may move in apparent memory as the datasets are mapped from the NVM address to that of a space addressable by the processor and/or memory controller. Additionally, objects may move as garbage collection is performed, or as a portion of memory fails and a replica is created elsewhere as part of the recovery process for the failed portion. Such movements within memory prevent defining a data item through a single address, and instead addressing can be performed via indirections (e.g., accessing a structure via a pointer to that structure). The massive scale of the NVM, available to store heap structures/datasets in some computing systems, complicates issues because the amount of NVM can exceed the space addressable by the memory controller. This constraint is in contrast to smaller scale heap-based systems, where a heap can belong to a specific process and sit entirely within its address space, and object movements can be handled by the garbage collection or other mechanism within that process by either an internal object table or by rewriting pointers in the process to point to the new location. However, the massive scale of NVM at issue in the present context can prevent such straightforward indirection approaches, and heavy indirections result in cumbersome and tedious memory management.

To address such issues, example implementations described herein may create a "fat pointer" based on an object reference, which holds a cache(s) of object addresses, as well as the ability to determine when such a cache has become invalidated (thus reverting back to a re-evaluation of the addresses through the indirections). Accordingly, example implementations can mitigate the cost of heavy indirect addressing otherwise imposed by the segmentation of massive memories, and movement of objects within the segments. Performance improvements can be achieved in a relatively non-resource-intensive manner, to address the issue of an object being movable in a dataset (and therefore in memory) independently of a process that is accessing the object. Thus, example implementations can mitigate performance issues introduced by indirect addressing of objects in dataset structures (e.g., in massive non-volatile memory). The figures illustrate example implementations, based on types of structures that can be used, and other variants having similar effects (in terms of locating and addressing objects, such as adding or removing indirection tables or levels of memory segmentation) are also possible.

Figure 1:
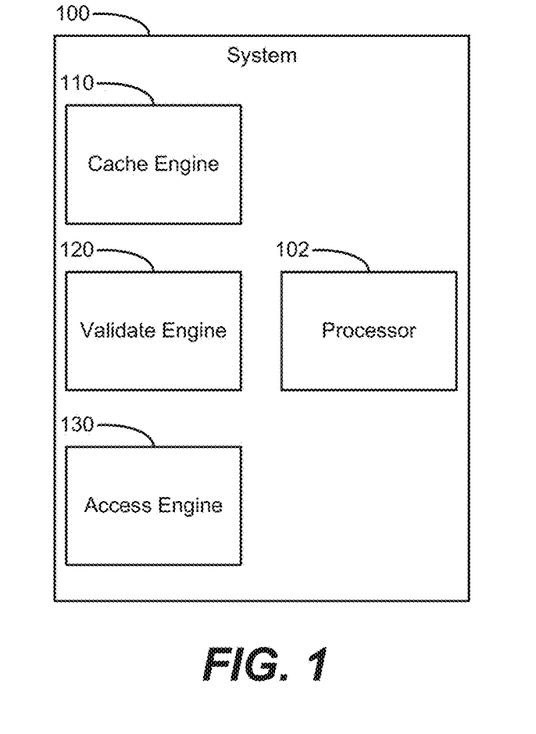
FIG. 1 is a block diagram of a system including a cache engine, validate engine, and access engine according to an example.

FIG. 1 is a block diagram of a system 100 including a cache engine 110, validate engine 120, and access engine 130 to interact with an object reference according to an example. The system 100 is also associated with a processor 102, which may execute instructions corresponding to the engines 110-130.

The cache engine 110 is to cache an object address (see FIG. 3) into an address cache of an object reference. In some implementations, the cache engine 110 can cache the object address in response to the system performing a lookup of the object via at least one indirection. Accordingly, for subsequent accesses, the cached object address, if still valid, can be used to directly access the object, without a need to perform heavy/cumbersome indirections to navigate the various layers of memory structures that can move within the massive memory space.

The validate engine 120 is to validate the cached object address, to check if the cached object address refers to its corresponding object. In some implementations, the validate engine 120 can validate whether an object ID, of the object located at the cached object address, corresponds to a reference object ID that is stored in the object reference for the object. Accordingly, the validate engine 120 can, prior to directly accessing the object through the cached object address, ensure that that object pointed to by the object address, has not been moved or replaced due to movements in memory.

The access engine 130 can then, in response to validating that the object ID of the object stored at the cached object address is valid, access the object via a lookup of the object address cached in the address cache of the object reference.

As described herein, the term "engine" may include electronic circuitry for implementing functionality consistent with disclosed examples. For example, engines 110, 120, and 130 represent combinations of hardware devices (e.g., processor and/or memory) and programming to implement the functionality consistent with disclosed implementations. In examples, the programming for the engines may be processor-executable instructions stored on a non-transitory machine-readable storage media, and the hardware for the engines may include a processing resource to execute those instructions. An example system (e.g., a computing device), such as system 100, may include and/or receive the tangible non-transitory computer-readable media storing the set of computer-readable instructions. As used herein, the processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

Such example approaches used by the cache engine 110, validate engine 120, and access engine 130 can mitigate various problems that would otherwise arise in the context of very large memory spaces, such as large spaces of NVM that can serve the functions of both random access memory and large pools of hard disk storage. The very large memory spaces can exceed a capacity of a computing system (e.g., of processor 102 or other memory processor, such as those based on 64-bit addressing) to be able to simultaneously address the entire memory space. Some example implementations can store pointer reference structures fairly randomly through the pool of memory, giving much more flexibility in contrast to a fixed list (e.g., linked list of pointers) where each item would strictly point to the next item and needs rigid updating to maintain memory pointers. Furthermore, some example implementations can create multiple replicas/copies of data. The copies can occupy different places in memory, and as failures and recoveries occur, the data can move throughout the memory pool. Garbage collection of NVM memory pools, where the system can compact memory together within one segment/dataset in view of deleted data, also can result in movement of data through the memory space. Unlike other garbage collection approaches for systems whose memory space is entirely simultaneously accessible, the context of the present implementations may include portions of memory that are not mapped into the memory space (or processor) simultaneously. Accordingly, it is not possible to cover the entire massive space using a single memory structure whose every pointer can simply be updated when movements (e.g., as a result of replicas/garbage collection) occur. Some example implementations can accommodate movements in massive memory spaces as a result of, e.g., taking a portion of the memory space out of service for replacement with another portion of memory from a different memory location, or performing load balancing by moving datasets around in the massive memory space, and so on.

Figure 2:
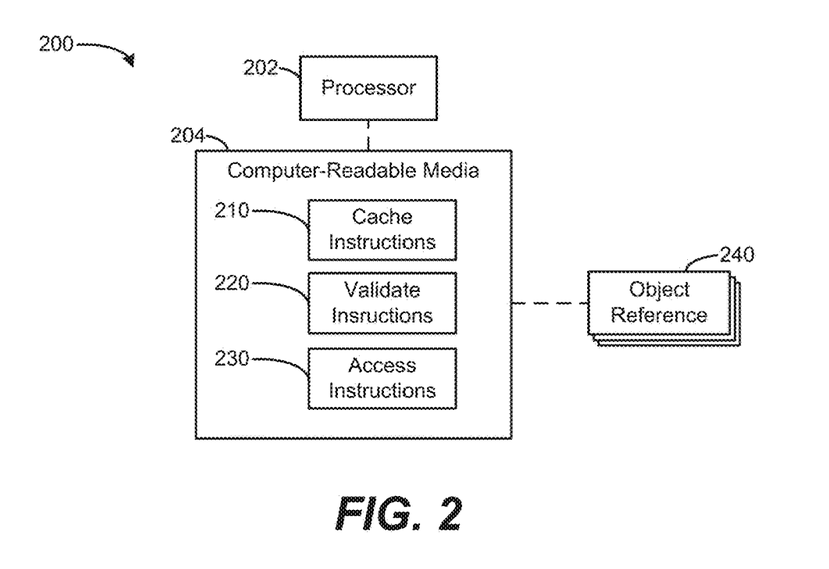
FIG. 2 is a block diagram of a system including cache instructions, validate instructions, and access instructions to interact with an object reference according to an example.

FIG. 2 is a block diagram of a system 200 including cache instructions 210, validate instructions 220, and access instructions 230 to interact with an object reference 240 according to an example. The system 200 also includes computer-readable media 204, associated with processor 202.

In some examples, operations performed when instructions 210-230 are executed by processor 202 may correspond to the functionality of engines 110-130. In FIG. 2, the operations performed when cache instructions 210 are executed by processor 202 may correspond to functionality of cache engine 110 (FIG. 1). Similarly, the operations performed when validate instructions 220 and access instructions 230 are executed by processor 202 may correspond, respectively, to functionality of validate engine 120 and access engine 130 (FIG. 1).

As set forth above with respect to FIG. 1, engines 110, 120, 130 may include combinations of hardware and programming. Such components may be implemented in a number of fashions. For example, the programming may be processor-executable instructions stored on tangible, non-transitory computer-readable media 204 and the hardware may include processor 202 for executing those instructions 210, 220, 230. Processor 202 may, for example, include one or multiple processors. Such multiple processors may be integrated in a single device or distributed across devices. Media 204 may store program instructions, that when executed by processor 202, implement system 100 of FIG. 1. Media 204 may be integrated in the same device as processor 202, or it may be separate and accessible to that device and processor 202.

In some examples, program instructions can be part of an installation package that when installed can be executed by processor 202 to implement system 100. In this case, media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 210-230, one or more instructions may be located remotely from media 204. Conversely, although FIG. 2 illustrates object reference 240 located separate from media 204, the object reference 240 may be included with media 204.

The computer-readable media 204 may provide volatile storage, e.g., random access memory for execution of instructions. The computer-readable media 204 also may provide non-volatile storage, e.g., hard disk or solid state disk for storage. Components of FIG. 2 may be stored in any type of computer-readable media, whether volatile or non-volatile. Content stored on media 204 may include images, text, executable files, scripts, or other content that may be used by examples as set forth below. For example, media 204 may contain configuration information or other information that may be used by engines 110-130 and/or instructions 210-230 to provide control or other information.

Figure 3:
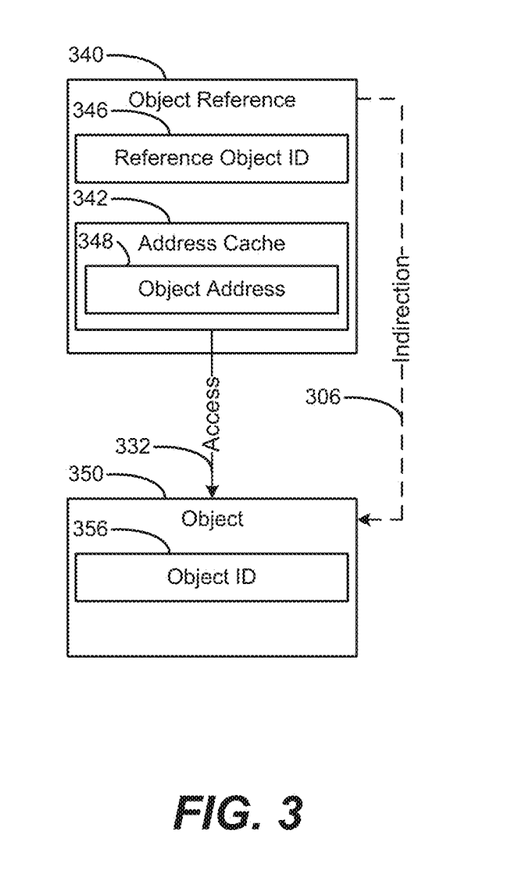
FIG. 3 is a block diagram of an object reference including a reference object ID and an address cache according to an example.

FIG. 3 is a block diagram of an object reference 340 including a reference object ID 346 and an address cache 342 according to an example. The address cache 342 is to cache at least one object address 348. The object reference 340 is to access an object 350, via indirection 306 and/or via a direct access 332. The object 350 is associated with an object ID 356, which can be checked against the reference object ID 346 to verify validity of the object 350 to be directly accessed 332.

The object address 348 can be determined based on relative addressing via at least one indirection 306, e.g., by combining an offset relative to a base address to locate an object 350. Multiple indirections 306 may be involved (e.g., obtaining a base address via relative addressing) in obtaining the location of an object 350 at the object address 348. This resultant object address 348 is then cached in the address cache 342, allowing the object reference 340 to directly find the object 350 via access 332, without a need to perform the indirection(s) 306.

Object addresses may be found by relative addressing via indirection(s) and also may be found by performing a lookup in a table (whose base address may also need to be found to access the table). In some examples, a table may be used to store an offset from the same base address as the table, or perhaps from a different base address. The resultant "actual" object address 348 found by the (possibly repeated use) of these techniques (base+offset, base+table lookup, and others including combinations of techniques) is cached in order not to have to repeatedly calculate the object address 348 when seeking the object 350. The object ID 356 (or other appropriate marker, such as the hashes 466, 468 of FIG. 4) can then be used to validate that the cached object address 348 is still valid. For replicas of the object 350, their corresponding replica object addresses 348 also can be cached, and also may use validity markers such as the object ID 356.

The object reference 340, or "fat pointer," can be implemented as data stored/resident in memory locations corresponding to referencing the object 350 (data structure). Thus, the object references 340 (e.g., fat pointer references) to data structures/objects 350, can be held in areas of memory such as operating system (OS) tables that are used to locate data structures, as well as being held in data structures that point to other data structures. The location of the fat pointer/object reference 340 is known to the OS, with the memory that contains the initial tables being mapped into a known location of the address space of a controller such as the central processing unit (CPU). The cached addresses/information can be logically associated with their corresponding fat pointer, and actually held in a local memory space of a processor/process. Alternatively, the cache of a fat pointer can be implemented as an indexed collection of caches, e.g., one per processor/process. In some example implementations, an initial table can be used to contain a list of datasets (see FIG. 5 for dataset table). Such a dataset table (or a set of such tables, for replicas/reliability) can be mapped into a known location as part of a boot-up process, to bootstrap the tables into memory to enable a system to start the following of a given fat pointer. In some example implementations, a memory controller (including its translation look-aside buffers (TLBs) and other associated structures) may include engines/hardware built-in with knowledge of such known locations to check for accessing tables/object references 340. Memory controllers (including hardware support) can cooperate with example implementations of software layers to enable functionality provided by object reference 340.

The data in the fat pointer/object reference 340 can be used to obtain the actual address of the object 350 data structure, given the current memory mappings. For example, the object reference 340 can indirectly access the object 350 via indirection 306, e.g., using relative addresses, offsets, pointers, and so on, to eventually obtain the actual address of the object 350, which can then be cached into the address cache 342 as the object address 348 to provide direct access 332. This type of information will be correct at time of construction, under normal operation, and may need to be updated (e.g., lazily for a given object reference 340) if the object 350 moves to a different address.

The object address 348 of the object reference 340 enables direct cached access to the object 350. However, if the object 350 has moved, the object address 348 may point to an old address that is no longer correct for the moved object 350. Accordingly, the object reference 340 includes the reference object ID 346, as a technique for enabling a system to validate whether the object address 348 is correct for a given object 350 being sought. For example, the system can compare the object ID 356 (stored with the object 350 located at the cached object address 348) to the reference object ID 346 stored at the object reference 340. In some example implementations, the object ID 356 can be stored as the first item in the object memory of the object 350, enabling straightforward locating and identifying by a system accessing the object 350 via the object address 348. If the object ID 356 is validated, the system can proceed to access 332 the object 350 via the object address 348 stored in the address cache 342 of the object reference 340. If the object ID 356 is not validated (e.g., does not match the reference object ID 346), the computing system can rebind the object 350 based on one or more indirections 306, e.g., via an object table (not shown in FIG. 3; see object table 574 in FIG. 5). In some alternate example implementations, other techniques of validation (e.g., markers) may be used, such as hash information or other types of IDs (e.g., see hashes 466, 468 in FIG. 4).

Example object references 340 therefore enable a system to directly access 332 and keep track of objects 350, without needing to use cumbersome indirections 306. Such benefits are enabled even in systems whose memory consists of a set of datasets that are independent of any specific process, and can be potentially addressed by any process, within a very large pool of memory whose size exceeds the capacity to be addressed simultaneously by a given CPU, and where objects 350 tend to move around. Examples can locate such datasets via an identity and a heap table(s) (which may be located at a (set of) addresses known to the system) to maintain the base addresses of the datasets including dataset replicas. This enables the system to locate the first segment of memory that enables location of any further addressing tables. A dataset may not be in contiguous memory, and if not, may contain a region table with the base address of each region within that dataset replica. A dataset (including replicas) can maintain an object table, which maps the object ID 356 to a specific region and offset.

An indirection 306 can be used as a less efficient way of locating an object 350, whose object address 348 can then be found via the indirection 306 and cached in the address cache 342 of the object reference 340. In some examples, an object 350 can be found via indirection(s) 306 by performing the following. Obtain the dataset base address from the dataset table, and select a replica; look up the reference object ID 346 in the object table of the selected dataset replica; look up the region ID of the object 350, using the reference object ID 346 indexing into the object table of the dataset; look up the offset in the region similarly; look up the region ID in the region table to obtain the region address; and finally add the region address to the offset to get the location of the object 350 at the corresponding object address 348. Furthermore, this indirection is to be done atomically, if there is the risk of the object 350 moving asynchronously (involving locking of the dataset during object ID dereferencing). Such indirect approaches are computationally expensive.

In contrast to performing the numerous components of an indirection, some example implementations described herein can directly access 332 an object 350 using the object reference 340, based at least in part on the following: providing fat pointers/object references 340 with an address cache 342 of object addresses/locations 348 (more than one if there are replicas), and providing the object ID 356 at a point in the memory (which contains the object 350) that the system is to access when seeking the object 350, enabling validation of the object 350. In this manner, a system can also easily dereference the cached location/object address

348, if it happens to be indicated as invalid (e.g., via a detected mismatch between the object ID 356 referenced by the object address 348). Upon such dereferencing (e.g., indicating that the object address 348 is no longer valid for the object 350 being sought), the indirection(s) 306 then can be reevaluated/followed and the resulting updated object address 348 can be checked and cached for the next use of the fat pointer/object reference 340. Such lazily updating approaches work particularly well with immutable data (that is not updated), as the object 350 itself does not need locking to cope with updates to the object 350. Example implementations can achieve efficiencies by lazily updating. If an object moves in memory, the system does not need to immediately stop other operations and try to update the address caches of object references that point to the object. Rather, a given object reference can be lazily updated by updating that object reference's address cache the next time the system attempts to access that object, on demand, and finds that the object is in a different place. Such updating can be referred to as rebinding, by performing indirections 306 to locate the object 350 and update the address cache 342 of the object reference 340 to point to the correct/updated location of the object 350. A pointer to the object 350 can be invalidated atomically by an atomic update to the reference object ID 346. To invalidate the object 350, the object IDs 356 of the object 350 and the replicas of the object 350 can be overwritten, deleted, and/or blanked-out to stop direct accesses from finding the object ID 356. To prevent an infinite loop of rebinds, mechanisms may be used to fail a rebind, if the full indirection chain has been passed through and the object ID 356 could still not be validated. Some example implementations can use mechanisms such as guaranteed time-delayed reuse to protect an object for reading, if the object cannot be read in a single atomic action, to avoid the memory being reused after invalidation (between the check and the reading of the data).

Unlike other notions of pointers generally, which merely refer to memory locations, the object reference 340 fat pointers include the ability to obtain the memory location itself. Accordingly, some example implementations of object references 340 do not suffer from the limitations of general pointers, which assume memory locations do not move, and assume that once located the referenced structure will remain in the same memory location.

The flexibility and usefulness provided by example implementations enables the object reference 340 to be used for long-lived persistent structures that move around in a very large pool of memory (e.g., vast memories exceeding the simultaneously accessible memory space of a CPU, where memory spaces themselves can move around in the vast memory pool and the address consistency assumption is broken). Example implementations are usable even when the underlying assumption of "address consistency" does not hold (as with vast memory pools), when the memory space is larger than that which can be addressed directly by the CPU, and where blocks of memory get mapped in and out (each time in a possibly different location) within the memory space of the CPU. The example implementations also provide reliability and replication within the environment of a vast pool of persistent non-volatile memory (without separate pools/structures dedicated to memory and disk storage), such that an example implementation of an object reference 340 can handle pointing to multiple objects 350 and/or replicas, and not merely to one object 350.

Figure 4:
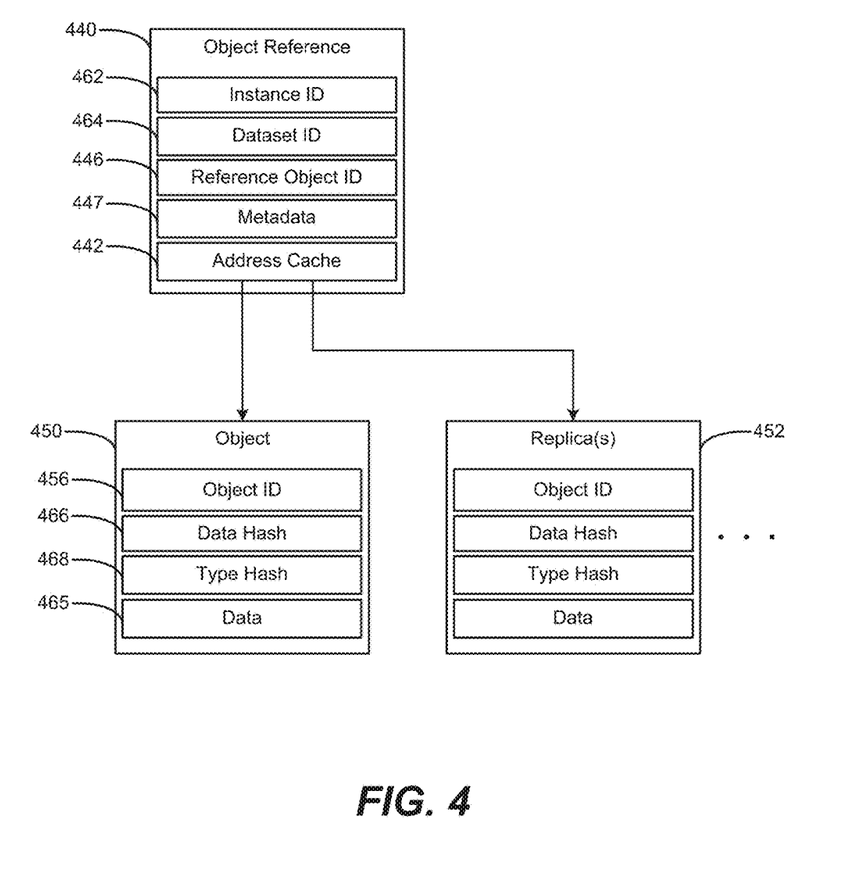
FIG. 4 is a block diagram of an object reference including a reference object ID and an address cache according to an example.

Although not specifically illustrated in FIG. 3, the object reference 340 can include an identifier to a dataset associated with the object 350, e.g., a dataset ID. In some example implementations, the dataset ID can be represented by an instance ID and a dataset ID, as shown in FIG. 4. In some example implementations, a series of IDs can be used to identify the location of the object 350, which can be accessed via multiple indirections 306 to locate the object 350. In some examples, a plurality of n indirections can be used to reach the actual dataset. An indirection represents accessing a structure via a pointer to that structure. The fat pointer/object reference 340 includes data (such as dataset, segment, etc.) to perform the indirections 306 to locate the object 350 in memory (including data to map the corresponding memory into the CPU address space, as needed).

FIG. 4 is a block diagram of an object reference 440 including a reference object ID 446 and address cache 442 according to an example. The object reference 440 also includes an instance ID 462, a dataset ID 464, and metadata 447. The address cache 442 points to the object 450. The object 450 includes an object ID 456, data hash 466, type hash 468, and data 465.

In addition to the features shown in the example implementation of FIG. 3, the object reference 440 of FIG. 4 includes instance ID 462 and dataset ID 464. Such features are optional, and the instance ID 462 and dataset ID 464 can be used when an object 450 is not in the same instance of an object store (where an object store is a logical collection of/container for one or more datasets), and/or not in the same dataset, as the object reference 440.

The address cache 442 can be used to cache the object addresses of the object 450, as well as its associated replica (s) 452. In an example implementation, the address cache 442 contains three different cached addresses of replicas 452 of the object 450. Thus, when updating the object 450, a system also can update the cached object addresses of the object 450 and replicas 452. When reading the object 450, a system can access the object 450 or any of its replicas 452 directly via the address cache 442. When writing, the system can validate (via reference object IDs 456 and their corresponding object IDs 456 in the object 450 and replicas 452) that the cached object addresses still point to their respective object/replicas. The system can use a locking and/or logging mechanism (not shown) to lock mutable objects/replicas to be written, in order to ensure data consistency across the object 450 and replicas 452 in view of the writes and/or moves taking place.

The object reference 440 can include metadata 447, to contain additional useful information for interacting with the object 450 and/or replicas 452. In some example systems, different portions of the memory pool can be associated with different performance characteristics, e.g., relative to a given memory controller. For example, memory locations physically nearer to the memory controller may offer faster accesses to that memory controller, compared to memory locations more distant. In such example systems, the metadata 447 may be used to store location information, in terms of a physical location of an object/replica within the memory space relative to the memory controller/CPU. The metadata 447 may store other attributes, such as a computational resource cost of accessing a given memory location, proximity between memory/processors, various speeds of different memories, attributes of the fabric(s) connecting the processors/CPUs, congestion points among memory/processor resources, and the like. Accordingly, the metadata 447 can enable a system to choose from among a plurality of objects/replicas, based on the metadata 447, to choose which may offer a lower computational resource cost of access, a faster response speed, a least likely to be congested, or other appropriate metric based on the metadata 447. The metadata 447 therefore provides guidance, such as memory location, as to which cached object address is a good candidate to use, from among a group of objects/replicas.

In an environment with non-uniform access to memory, the address cache 442 and/or metadata 447 associated with the caches (such as cost of access) may be different per processor. Accordingly, the address cache 442 and/or the metadata 447 may be held on a per-process or per-processor basis. This enables object references 440 to cope with different virtual address mappings between processes, and/or different physical address mappings between processors. The address cache 442 and/or the metadata 447 may be held on a per-process or per-processor basis might by, e.g., using process-specific and/or processor-specific storage (memory), or by having a shared cache that is indexed by such information. Accordingly, example implementations may use localized views of the caches or other information.

The instance ID 462, dataset ID 464, and reference object ID 446 enable the object reference 440 to be used in the context of segmented addressing, where references/pointers can point to the beginning of a given segment, and within that segment, pointers can be expressed relative to the beginning of that segment. In some example implementations, the dataset ID 464 can be used to represent a portion of a heap/dataset. The instance ID 464 can be used to identify which copy of the object store to use.

As for validating the object 450, the data hash 466 and type hash 468 enable additional opportunities for a system to validate that a given object 450 (or replica 452) matches the intended object whose address is cached in the address cache 442. Thus, the hashes can provide additional options beyond the reference object ID 446 when it comes to validation, and are optional. Beyond validating the object ID 456 to determine whether the object 450 has moved, the system can also check the data hash 466 (generated as a hash function of the object's data 465). The type hash 468 can be used to identify what type the object is, without needing to actually look at the data 465.

Figure 5:
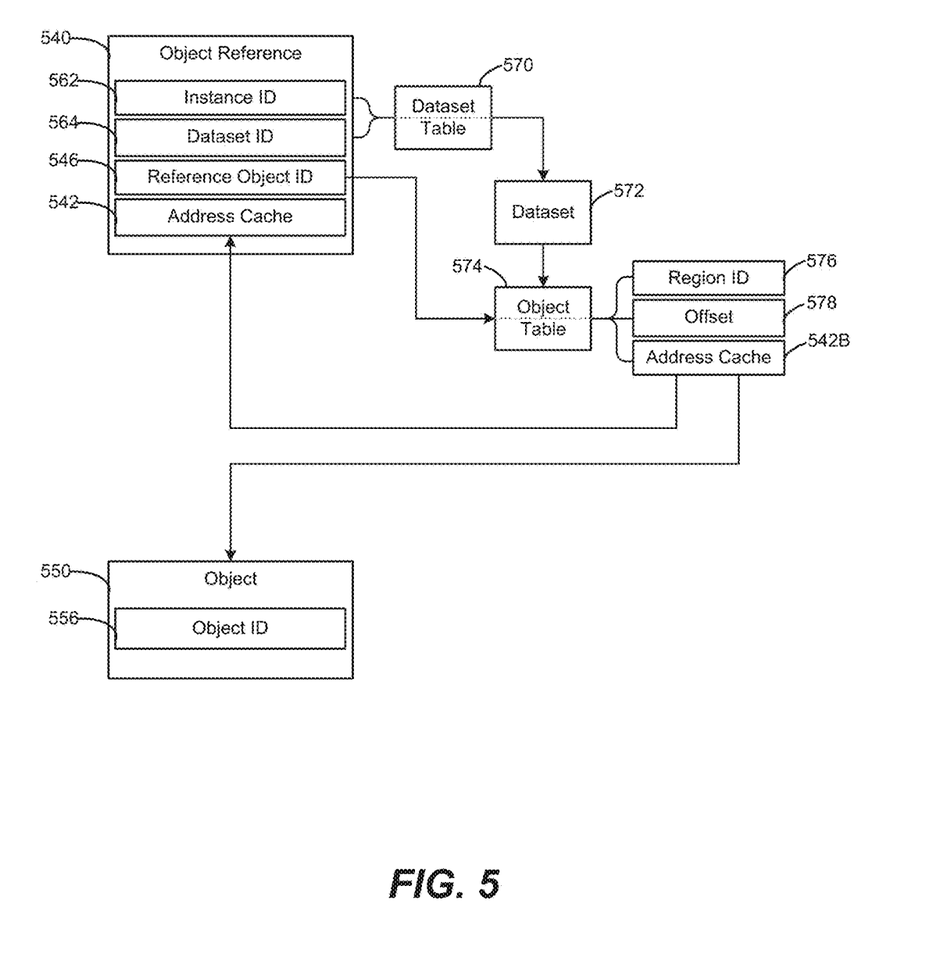
FIG. 5 is a block diagram of an object reference including a reference object ID used with an object table according to an example.

FIG. 5 is a block diagram of an object reference 540 including a reference object ID 546 used with an object table 574 according to an example. The object reference 540 also includes an address cache 542, an instance ID 562, and a dataset ID 564. The address cache 542 can be updated, via the use of the object table 574 and address cache 5426, to point to the object 550 that has moved. The object 550 includes an object ID 556. The dataset table 570 can be used to identify dataset 572, used in conjunction with the object table 574 to identify region ID 576, offset 578, and update the address caches 542B, 542.

The operations illustrated in FIG. 5 can be performed as a rebind, using the object table 574. A computing system can validate the object 550, by checking the object ID 556 (e.g., using a convention of storing the object ID 556 as the first item of the object 550, therefore located as the first item in object memory corresponding to the cached object address in the address cache 542 for the object 550). If validated, the system can use the object 550 without a need to rebind.

However, the system can perform the illustrated rebind (and thereby update the cached object address) in response to the object ID 556 failing to validate (by not matching the reference object ID 546). Such a validation failure can arise, e.g., after the computing system performs a compacting garbage collection procedure, which can move given objects 550 around within a given dataset 572 and/or memory space (with corresponding updating of the object table 574 due to the garbage collection). The arrows in FIG. 5 represent the logical flow of lookups, addresses being returned, and from where the addresses are being returned. The various tables can be formed by data structures/maps such as a linked list of entries, a hash table of entries, or other suitable approach for a particular data structure being used. In an example, the data structure can be chosen for suitability in returning an address, or another identifier, in response to being presented with a given identifier (ID). So for example the dataset table 570 structure can receive the dataset ID 564, and return the address of where to look up that corresponding dataset 572. The dataset table 570 and the object table 574 can be types of addressing tables, used to look up memory addresses, or other types of structures (e.g., other than tables) to access information corresponding to a given ID, consistent with performing indirections. The object table 574 can be found via a dataset ID (assuming a dataset has its own object table).

In some example implementations, a hierarchy of tables can be used to perform indirections, and tables can be used to store additional information. For example, the address cache 542B can be used to cache addresses in the object table 574, to provide additional optimization and enable a separate pointer update process to share information with other processes. For example, a separate process that updates the pointers can share the information with the other processes that first check in the object table 574 for new addresses, then the system can recalculate if there are none or if they are invalid. Accordingly, if a given object address has not yet been cached, or if the address cache 542 or reference object ID 546 is otherwise not ready or invalid, the process can look up the information directly cached in the object table 574 at the address cache 542B, without needing to perform a full region indirection. A hierarchy of tables can be associated with one or more tables, such the dataset table 570, object table 574, or other table. The hierarchy can form a chain of tables, whereby this type of dereferencing shown in FIG. 5 can be cached to one or more of the tables in the chain. The chain of tables can include multiple different types of tables in the chain, and is not limited to a chain of object tables. In some example implementations, the chain of tables can include a dataset table(s), object table(s), and region table(s). As illustrated, the object table 574 was chosen to cache addresses (using the address cache 542B), but other tables may be used in alternate examples. Generally, a given table such as the object table 574 itself can be broken up into a series of smaller object tables (not shown) to form a hierarchy/chain. Each table/level in the hierarchy/chain can be used to cache addresses/information, and the end of the chain can be cached in the fat pointer/object reference 540. In some example implementations, for any n levels of indirection, a table can be used at each $n^{th}$ level, which can be cached such that a given operation would need only traverse through as much of the n levels as needed to find a valid entry. Upon finding a valid entry in the chain, the system can then update the cached information down the chain, thereby improving the speed of subsequent access to the information in the hierarchy/chain of tables. Example implementations can update information down the chain based on various approaches, such as by lazy updating, eager updating, and so on. For lazy updating, the system can update the information down a single branch of the chain, ending at the fat pointer in question. For eager updating, the system can traverse down multiple branches of the chain, updating caches along the way. Other approaches are possible, including combinations of different approaches.

The instance ID 562 and the dataset ID 564 can be used to identify a segment being sought, by performing a lookup in the dataset table 570 to find out where the dataset 572 is located. The dataset table 570 thereby tracks where segments of memory are, which are in use. The dataset table 570 thereby provides the pointer, e.g., the actual memory location in the computer system's memory pool, in which the computer system sees the dataset 572. In some example implementations, the dataset table 570 can be provided on a per-CPU basis, where each dataset 572 resides within its memory. The object ID 546 is then used to look up, in the object table 574 corresponding to the identified dataset 572, an actual offset within the dataset 572 of the actual object 550. Thus, the computing system can look up in the object table 574, which is in a known place within the dataset 572 (e.g., the beginning or the end, or some other designated location), and within the object table 574, finds the object ID 556 and obtains the actual address offset 578 relative to the beginning of the dataset 572 of that object 550. That address, found via the illustrated indirection, then can be cached in the address cache 542B of the object table 574, and can be cached as the object address in the address cache 542 of the object reference 540, in response to performing the lookup/indirection.

There is a possibility that the object table 574 already has the correct cached address information, in which case it is not needed to perform the indirect lookups/indirection beyond arriving at that address cache 542B of the object table 574B. In that situation (e.g., in response to the system performing a validation to the object table 574), the computing system can efficiently use the address cache 542B and then directly access the cached object address and directly access the object 550. If the information is not correct, the system can perform a more complete rebind, e.g., as illustrated in FIG. 6.

The illustrated rebinding operations, in the context of fat pointers, can be used in various situations where not all the pointers would otherwise be updated. For example, garbage collection over a dataset can update the pointers and other caches stored within the dataset—including the object table 574—but not the pointers held in processes or persisted in other locations such as in other datasets. Failure and recovery also can benefit, by recreating a region or dataset replica from one of the other replicas, which may simply reset any caches within the datasets rather than recalculate caches that may not be needed.

Figure 6:
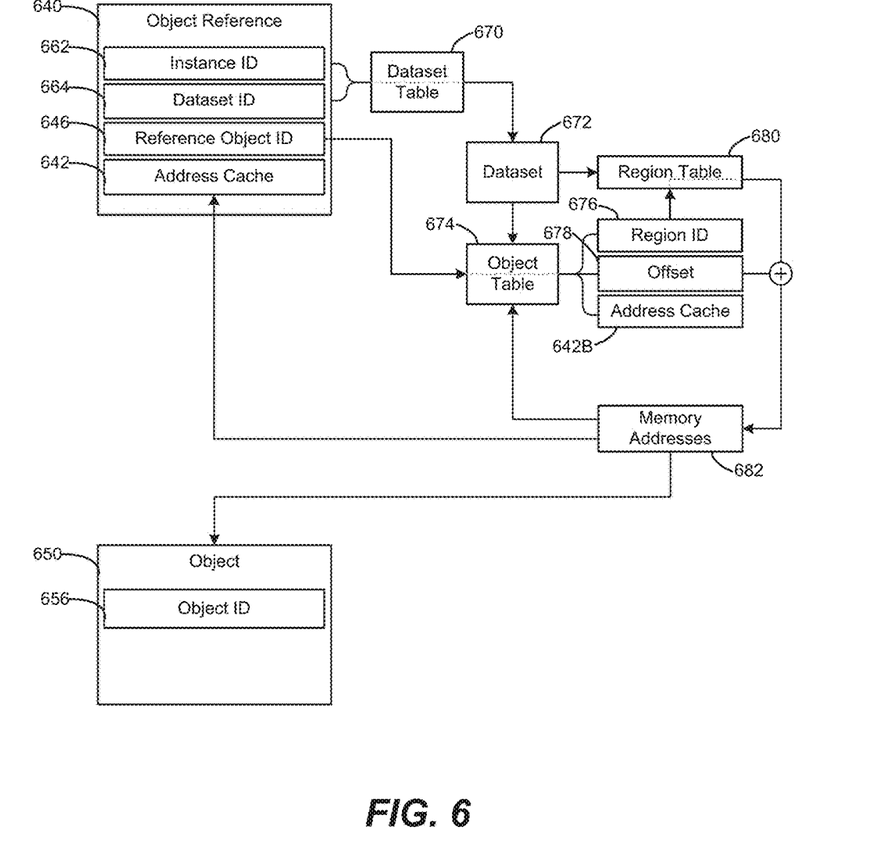
FIG. 6 is a block diagram of an object reference including a dataset ID used with a region table according to an example.

FIG. 6 is a block diagram of an object reference 640 including a dataset ID 664 used with a region table 680 according to an example. The object reference 640 also includes an address cache 642, an instance ID 662, and a dataset ID 664. The address cache 642 can be updated, via the use of the object table 674 and region table 680, to point to the object 650 that has moved. The object 650 includes an object ID 656. The dataset table 670 can be used to identify dataset 672, used in conjunction with the object table 674 (to identify region ID 676, offset 678, and region ID 676, to identify the region table 680 and update the address caches 642B, 642.

A full rebind is illustrated in FIG. 6, which can be performed in response to a failure of a memory segment(s) and corresponding change(s) of segment address(es). Object references 640 and the object tables 674 can be lazily updated. The memory addresses 682 (cached to the address cache 642 and/or the object table 674) shown in FIG. 6 can effectively be determined based on a function of other values, such as the region ID offsets 678 and a region base address (which is mapped to a region ID in the region table 680). For example, the system can determine a sum of the other values, or perform some other combination/calculation, such as concatenation, or more advanced schemes involving modulo arithmetic, etc. The memory addresses 682 are object addresses that point to the object 650 and/or replica(s), which can be validated by their object IDs 656. If there is one or more replicas, the system can identify whether a cached object address of the replica is valid, before committing to such remapping.

The region ID 676 can be used to identify which replica is being used, and region IDs 676 potentially can have different addresses. These regions can be mapped if the system is going to perform updates, although a read can be performed by mapping as few as one of the replicas/regions.

Figure 7:
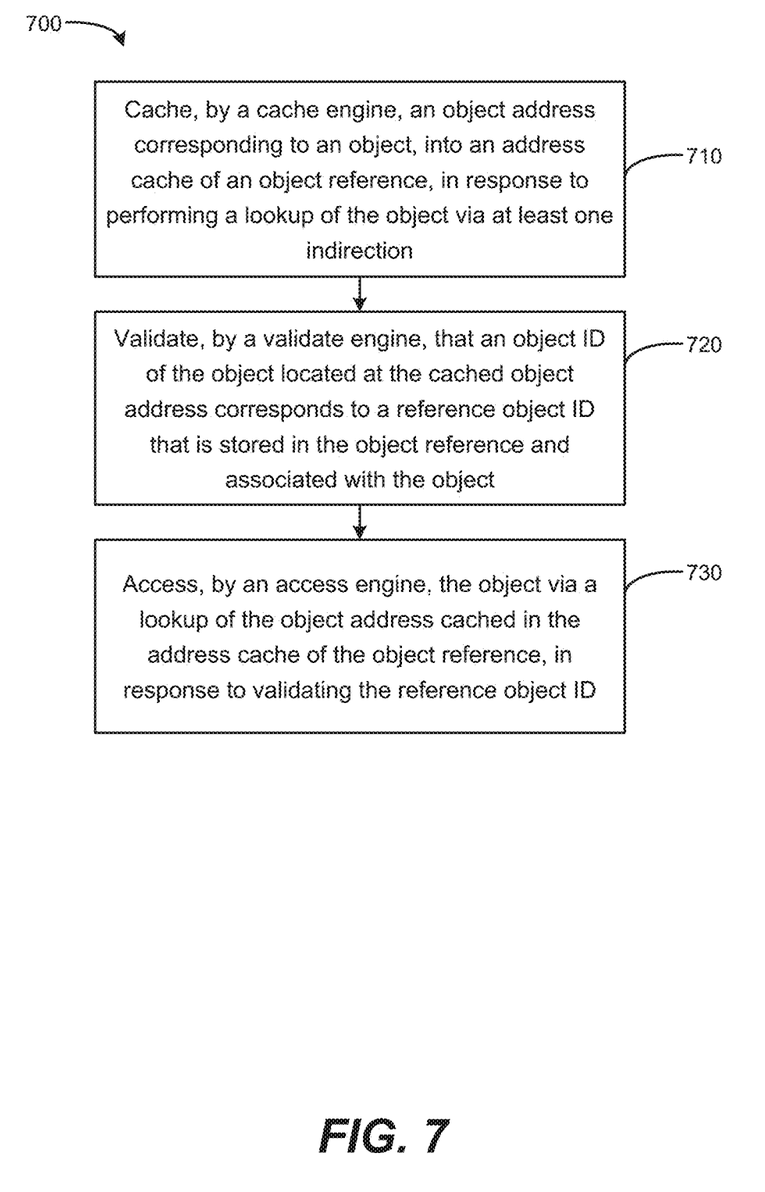
FIG. 7 is a flow chart to access an object based on a lookup via an address cache of an object reference according to an example.
Figure 8:
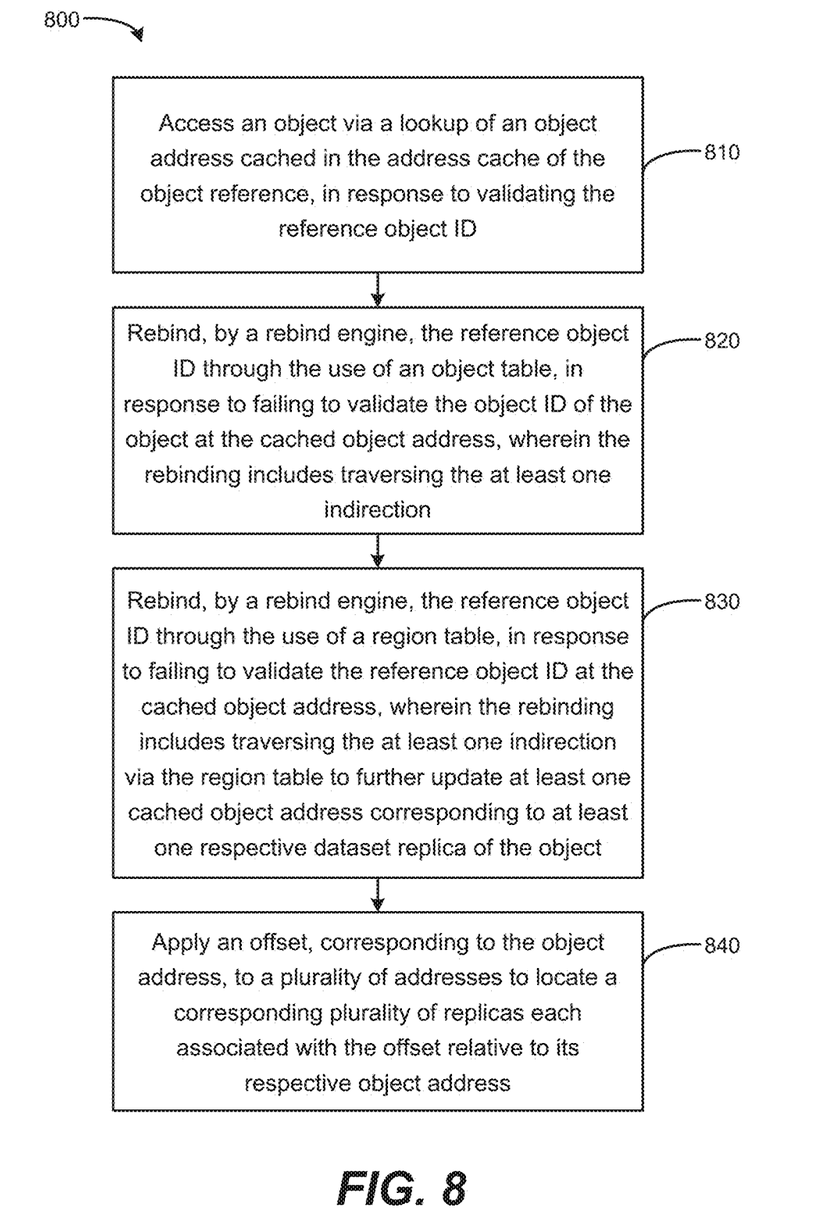
FIG. 8 is a flow chart based on rebinding a reference object ID according to an example.

Referring to FIGS. 7 and 8, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 7 is a flow chart 700 to access an object based on a lookup via an address cache of an object reference according to an example. In block 710, a cache engine is to cache an object address corresponding to an object, into an address cache of an object reference, in response to performing a lookup of the object via at least one indirection. For example, the cache engine can be used when an object address is not already cached. When performing the comparatively less efficient indirection to obtain the object address, the cache engine can store the resulting information in the address cache of the object reference, as an object address. In block 720, a validate engine is to validate that an object ID of the object located at the cached object address corresponds to a reference object ID that is stored in the object reference and associated with the object. For example, the validate engine can obtain the reference object ID from the object reference, and compare it to a value located at an expected location/offset relative to the object address, such as obtaining the first value stored at the object address and treating that value as the object ID to be compared. In block 730, an access engine is to access the object via a lookup of the object address cached in the address cache of the object reference, in response to validating the reference object ID. For example, upon validating the object ID, the access engine can then access data or other information of the object and treat the object as though it is located at the object address, by validating that the object has not been moved to another location.

FIG. 8 is a flow chart 800 based on rebinding a reference object ID according to an example. In block 810, an object is accessed via a lookup of an object address cached in the address cache of the object reference, in response to validating the reference object ID. For example, the technique outlined in FIG. 7 may be used to cache, validate, and access the object. In block 820, a rebind engine is to rebind the reference object ID through the use of an object table, in response to failing to validate the object ID of the object at the cached object address, wherein the rebinding includes traversing at least one indirection. For example, a system may use the approach outlined in FIG. 5 regarding rebinding the reference object ID 546 via traversing the illustrated indirection using the object table 574. In block 830, a rebind engine is to rebind the reference object ID through the use of a region table, in response to failing to validate the reference object ID at the cached object address, wherein the rebinding includes traversing the at least one indirection via the region table to further update at least one cached object address corresponding to at least one respective dataset replica of the object. For example, a system may use the approach outlined in FIG. 6 regarding rebinding the reference object ID 646 via traversing the illustrated indirection using the object table 674 and region table 680. In block 840, an offset, corresponding to the object address, is applied to a plurality of addresses to locate a corresponding plurality of replicas each associated with the offset relative to its respective object address. For example, an offset such as offset 578 of FIG. 5 or offset 678 of FIG. 6 may be applied to obtain a plurality of replicas such as replicas 452 shown in FIG. 4.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct an access engine to access an object in response to validating its reference object ID, wherein the various engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:
   a cache engine to cache, into an address cache of an object reference, an object address corresponding to an object, in response to performing a lookup of the object via at least one indirection;
   a validate engine to validate that an object ID of the object located at the cached object address corresponds to a reference object ID that is stored in the object reference and associated with the object; and
   an access engine to access the object via a lookup of the object address cached in the address cache of the object reference, in response to validating the reference object ID.

2. The system of claim 1, wherein the object address cached in the address cache of the object reference is to point to at least one address of at least one region segment corresponding to a location of the object, and wherein the address cache is held on at least one of i) a per-process, and ii) a per-processor basis, to provide a localized view of the address cache.

3. The system of claim 1, wherein the object reference includes an instance ID corresponding to an object store instance associated with a location of the object, and a dataset ID corresponding to a dataset associated with the location of the object, wherein the instance ID is for use in performing indirections for objects not in the same object store instance as the object, and wherein the dataset ID is for use in performing indirections for objects not in the same dataset as the object.

4. The system of claim 1, further comprising an object table to provide an actual offset within a dataset corresponding to the location of the object.

5. The system of claim 1, further comprising a chain of tables for a plurality of levels of indirection, traversable across the chain until a valid entry is found, wherein the cache engine is to update the chain of tables with the valid entry once found.

6. The system of claim 1, wherein the object reference further includes at least one of i) a data hash, and ii) a type hash, to further verify that the object pointed to by the address cache corresponds the reference object ID, independent of whether the object ID of the object matches the reference object ID of the object reference.

7. The system of claim 1, wherein the object reference further includes metadata identifying additional characteristics of the at least one address referenced by the address cache.

8. The system of claim 1, wherein the object address corresponds to a memory address space associated with the at least one indirection.

9. A method, comprising:
   caching, by a cache engine, an object address corresponding to an object, into an address cache of an object reference, in response to performing a lookup of the object via at least one indirection;
   validating, by a validate engine, that an object ID of the object located at the cached object address corresponds to a reference object ID that is stored in the object reference and associated with the object; and
   accessing, by an access engine, the object via a lookup of the object address cached in the address cache of the object reference, in response to validating the reference object ID.

10. The method of claim 9, further comprising rebinding, by a rebind engine, the reference object ID through the use of an object table, in response to failing to validate the object ID of the object at the cached object address, wherein the rebinding includes traversing the at least one indirection.

11. The method of claim 9, further comprising using an instance ID and dataset ID to identify a memory segment to look up a dataset table of the memory segment and identify a location of a dataset associated with the identified memory segment, and using the reference object ID on the object table of the dataset to find an actual address offset relative to the beginning of the dataset of that object, and caching the object address, as offset from the actual address offset, in the address cache of the object reference.

12. The method of claim 9, further comprising rebinding, by a rebind engine, the reference object ID through the use of a region table, in response to failing to validate the reference object ID at the cached object address, wherein the rebinding includes traversing the at least one indirection via the region table to further update at least one cached object address corresponding to at least one respective dataset replica of the object.

13. The method of claim 9, further comprising applying an offset, corresponding to the object address, to a plurality of addresses to locate a corresponding plurality of replicas each associated with the offset relative to its respective object address.

14. A non-transitory machine-readable storage medium encoded with instructions executable by a computing system that, when executed, cause the computing system to:

cache, into an address cache of an object reference, an object address corresponding to an object, in response to performing a lookup of the object via at least one indirection, wherein the object address corresponds to a memory address space associated with the at least one indirection;

validate that an object ID of the object located at the cached object address corresponds to a reference object ID that is stored in the object reference and associated with the object; and access the object via a lookup of the object address cached in the address cache of the object reference, in response to validating the reference object ID.

15. The storage medium of claim 14, further comprising instructions that cause the computing system to lazily update the object address cached in the address cache, in response to failing to validate that the object ID of the object corresponds to the reference object ID stored in the object reference.

* * * * *